US011827059B2

(12) United States Patent
Nakajima (10) Patent No.: US 11,827,059 B2
(45) Date of Patent: Nov. 28, 2023

(54) TIRE

(71) Applicant: SUMITOMO RUBBER INDUSTRIES, LTD., Hyogo (JP)

(72) Inventor: Koichi Nakajima, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

(21) Appl. No.: 17/903,430

(22) Filed: Sep. 6, 2022

(65) Prior Publication Data

US 2023/0089811 A1  Mar. 23, 2023

(30) Foreign Application Priority Data

Sep. 17, 2021 (JP) ................................ 2021-152027

(51) Int. Cl.
*B60C 11/13* (2006.01)
*B60C 11/03* (2006.01)
*B60C 11/12* (2006.01)

(52) U.S. Cl.
CPC ...... *B60C 11/1307* (2013.01); *B60C 11/0309* (2013.01); *B60C 11/1204* (2013.01); *B60C 2011/0365* (2013.01); *B60C 2011/0369* (2013.01); *B60C 2011/1213* (2013.01); *B60C 2011/133* (2013.01)

(58) Field of Classification Search
CPC ............. B60C 11/1307; B60C 11/0309; B60C 11/0323; B60C 2011/0369; B60C 2011/133; B60C 2011/0365
See application file for complete search history.

(56) References Cited

U.S. PATENT DOCUMENTS 5,031,680 A    7/1991  Kajikawa et al.
10,308,081 B2 * 6/2019  Jacobs ............... B60C 11/0306
(Continued)

FOREIGN PATENT DOCUMENTS

EP      2311656       4/2011
JP      2016-199119   12/2016
KR      2020-0123302  10/2020

OTHER PUBLICATIONS

Extended European Search Report Issued in Corresponding EP Patent Application No. 22190082.2, dated Jan. 24, 2023.

*Primary Examiner* — Justin R Fischer
*Assistant Examiner* — Wendy L Boss
(74) *Attorney, Agent, or Firm* — Greenblum & Bernstein, P.L.C.

(57) ABSTRACT

A tread portion includes a groove having first and second groove walls opposing each other, at least one first recess formed by partially recessing the first groove wall, and at least one second recess formed by partially recessing the second groove wall. A depth of each of the first and second recess from a ground contact surface is less than a groove depth of the groove. The first recess includes a first opening disposed at the first groove wall, and a first end portion extending substantially parallel to the first opening at a position farthest from the first opening. The second recess includes a second opening disposed at the second groove wall, and a second end portion extending substantially parallel to the second opening at a position farthest from the second opening. The first and second end portions are disposed so as not to oppose each other through the groove.

17 Claims, 5 Drawing Sheets

(56) References Cited

U.S. PATENT DOCUMENTS

| | | | |
|---|---|---|---|
| 2015/0059943 A1* | 3/2015 | Radulescu | B60C 11/04 152/209.17 |
| 2016/0152093 A1 | 6/2016 | Sakiyama et al. | |
| 2016/0297255 A1 | 10/2016 | Wakizono | |
| 2018/0370290 A1 | 12/2018 | Hirosue et al. | |
| 2019/0210410 A1* | 7/2019 | Tikka | B60C 11/0306 |
| 2021/0155050 A1* | 5/2021 | Monji | B60C 11/0306 |
| 2021/0178824 A1 | 6/2021 | Kristen et al. | |
| 2022/0227176 A1* | 7/2022 | Tomida | B60C 11/0306 |

* cited by examiner

TIRE

CROSS REFERENCE TO RELATED APPLICATION

The present application claims priority to Japanese patent application JP 2021-152027, filed on Sep. 17, 2021, the entire contents of which are incorporated herein by reference in its entirety.

BACKGROUND

Technical Field

The present disclosure relates to a tire that includes a tread portion having a ground contact surface.

Background Art

To date, a tire having a plurality of grooves formed for enhancing on-snow performance has been known. For example, Japanese Laid-Open Patent Publication No. 2016-199119 suggests a pneumatic tire that has cut portions formed at portions at which the main groove and lug grooves intersect each other to enhance a snow column shearing force.

However, even in a case where the tire disclosed in Japanese Laid-Open Patent Publication No. 2016-199119 is used, a snow column shearing force may be reduced during running with the tire on, for example, a compressed snow road surface, and further improvement has been required for on-snow performance.

The present disclosure has been made in view of the aforementioned circumstances, and a main object of the present disclosure is to provide a tire that allows on-snow performance during running on a compressed snow road surface to be enhanced.

SUMMARY

The present disclosure is directed to a tire including a tread portion having a ground contact surface. The tread portion includes a groove having a first groove wall and a second groove wall opposing each other, at least one first recess formed by partially recessing the first groove wall, and at least one second recess formed by partially recessing the second groove wall. A depth of each of the first recess and the second recess from the ground contact surface is less than a groove depth of the groove. The first recess includes, in the ground contact surface, a first opening disposed at the first groove wall, and a first end portion extending substantially parallel to the first opening at a position farthest from the first opening. The second recess includes, in the ground contact surface, a second opening disposed at the second groove wall, and a second end portion extending substantially parallel to the second opening at a position farthest from the second opening. The first end portion and the second end portion are disposed so as not to oppose each other through the groove.

The tire of the present disclosure has the above-described structure, and can thus tread snow at the first recess and the second recess even on a compressed snow road surface, and allow on-snow performance during running on a compressed snow road surface to be enhanced.

DETAILED DESCRIPTION

Embodiments of the present disclosure will be described below in detail with reference to the drawings.

Figure 1:
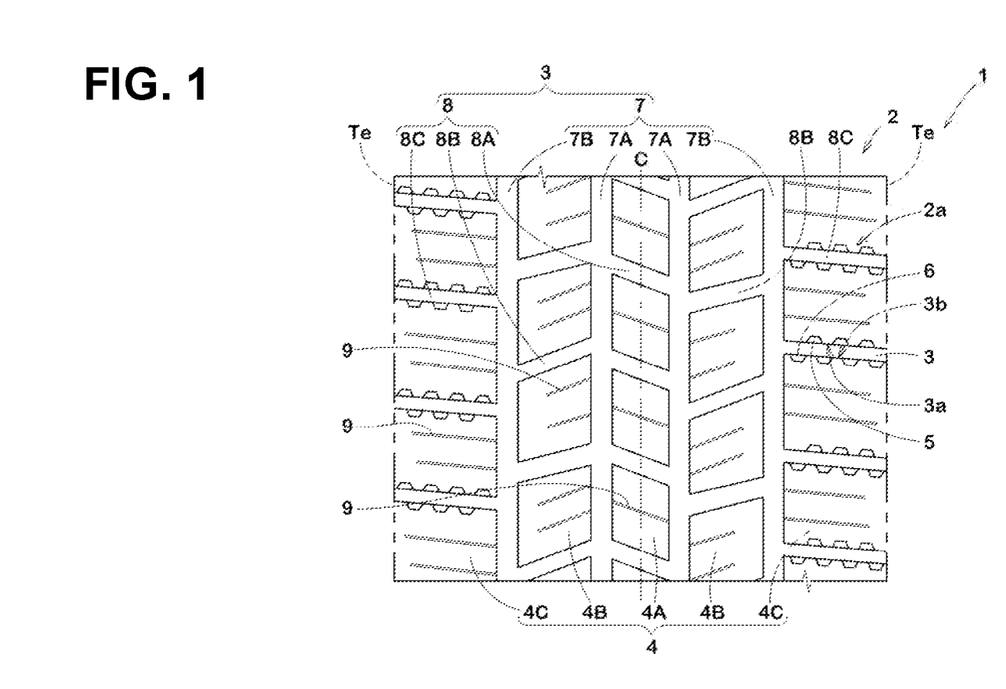
FIG. 1 is a development schematically illustrating a tread portion of a tire according to one embodiment of the present disclosure.

FIG. 1 is a development schematically illustrating a tread portion 2 of a tire 1 according to the present embodiment. As shown in FIG. 1, the tire 1 of the present embodiment includes the tread portion 2 having a ground contact surface 2a. The tread portion 2 of the present embodiment has a plurality of grooves 3 and block-shaped land portions 4 demarcated by the plurality of grooves 3.

The tire 1 can be suitably adopted as, for example, a winter pneumatic tire having excellent on-snow performance and on-ice performance. The tire 1 is not limited to a winter pneumatic tire, and the tire 1 can be used for various tires 1 such as a heavy-duty pneumatic tire and a non-pneumatic tire the inside of which is not filled with pressurized air.

The groove 3 includes, for example, a first groove wall 3a and a second groove wall 3b opposing each other. In the present embodiment, the tread portion 2 includes at least one first recess 5 formed by partially recessing the first groove wall 3a and at least one second recess 6 formed by partially recessing the second groove wall 3b. The tread portion 2 having such a structure can tread snow at the groove 3, the first recess 5, and the second recess 6 to enhance on-snow performance of the tire 1. The first recess 5 and the second recess 6 are partially recessed portions, and degradation of noise performance of the tire 1 can thus be inhibited.

Figure 2:
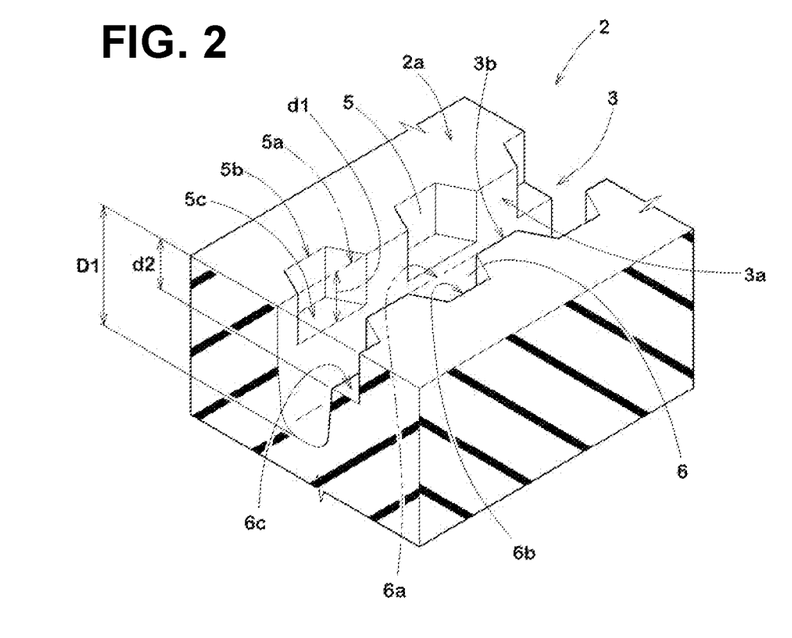
FIG. 2 is a perspective cross-sectional view of a groove.
Figure 3:
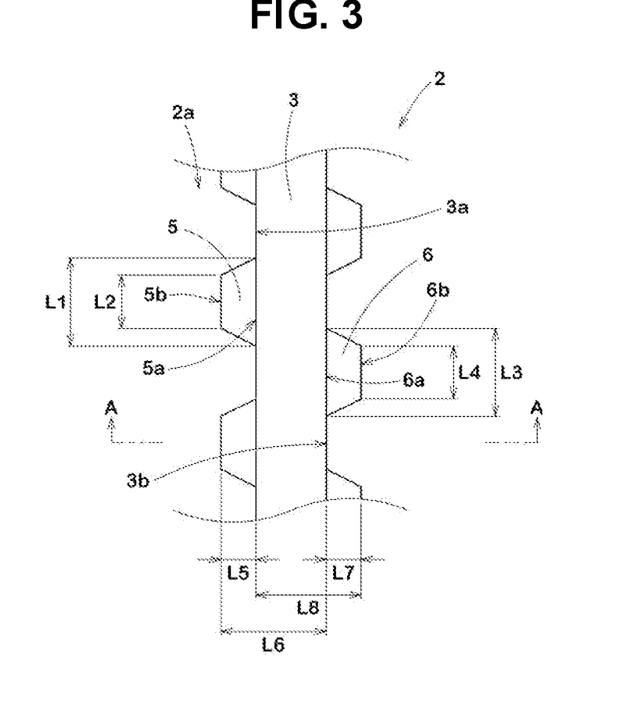
FIG. 3 is a plan view of the groove shown in FIG. 2.
Figure 4:
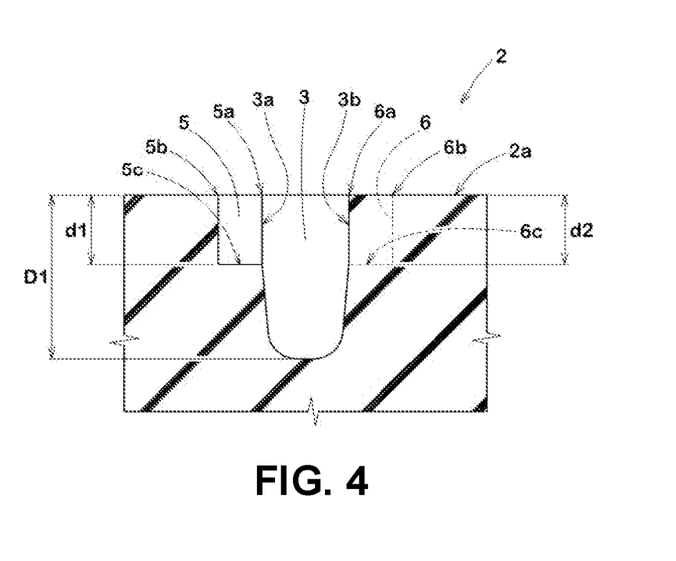
FIG. 4 is a cross-sectional view taken along a line A-A in FIG. 3.

FIG. 2 is a perspective cross-sectional view of the groove 3. FIG. 3 is a plan view of the groove 3 in FIG. 2. FIG. 4 is a cross-sectional view taken along a line A-A in FIG. 3. As shown in FIG. 2 to FIG. 4, in the present embodiment, depths d1 and d2 of the first recess 5 and the second recess 6, respectively, from the ground contact surface 2a are each less than a groove depth D1 of the groove 3. The first recess 5 and the second recess 6 having such structures allow snow to be trodden also during running on a compressed snow road surface, and contribute to enhancement of on-snow performance of the tire 1.

In the present embodiment, the first recess 5 has, in the ground contact surface 2a, a first opening 5a disposed at the first groove wall 3a, and a first end portion 5b extending substantially parallel to the first opening 5a at the position farthest from the first opening 5a. The first recess 5 having such a structure allows snow to be efficiently trodden between the first opening 5a and the first end portion 5b, and can enhance on-snow performance of the tire 1. The first end portion 5b can exhibit an edge effect in conjunction with the first groove wall 3a and contributes to enhancement of on-snow performance of the tire 1. In the description herein, substantially parallel means that an angle between both subject portions is not greater than 5°.

In the present embodiment, the second recess 6 has, in the ground contact surface 2a, a second opening 6a disposed at the second groove wall 3b, and a second end portion 6b extending substantially parallel to the second opening 6a at the position farthest from the second opening 6a. The second recess 6 having such a structure allows snow to be efficiently trodden between the second opening 6a and the second end portion 6b, and can enhance on-snow performance of the tire 1. The second end portion 6b can exhibit an edge effect in conjunction with the second groove wall 3b, and contributes to enhancement of on-snow performance of the tire 1.

In the present embodiment, the first end portion 5b and the second end portion 6b are disposed so as not to oppose each other through the groove 3. The first recess 5 and the second recess 6 having such structures inhibit generation of snow clogging, and can enhance on-snow performance of the tire 1. Furthermore, the first recess 5 and the second recess 6 are suitable for treading snow in a wide range of a compressed snow road surface, and contribute to enhancement of on-snow performance of the tire 1. Therefore, in the present embodiment, the tire 1 can allow on-snow performance during running on a compressed snow road surface to be enhanced.

In a more preferable mode, as shown in FIG. 1, the grooves 3 include, for example, a plurality of circumferential grooves 7 extending in the tire circumferential direction, and a plurality of lateral grooves 8 extending in the tire axial direction. A plurality of sipes 9 extending in the tire axial direction are preferably disposed in the land portions 4.

The sipe 9 is a narrow groove having a width of not greater than 2 mm and is distinguished from the groove 3. Each of the block-shaped land portions 4 preferably has at least one sipe 9. The tread portion 2 having such a structure allows a snow column shearing force and an edge effect to be exhibited by the grooves 3 and the sipes 9, and can enhance on-snow performance of the tire 1.

FIG. 1 schematically illustrates the circumferential grooves 7, the lateral grooves 8, and the sipes 9 that linearly extend. However, the circumferential grooves 7, the lateral grooves 8, and the sipes 9 are not limited thereto, and may zigzag.

The circumferential grooves 7 include, for example, a pair of crown circumferential grooves 7A disposed along a tire equator C, and shoulder circumferential grooves 7B disposed between the crown circumferential grooves 7A and tread ground contact ends Te.

The tread ground contact ends Te represent outermost ground contact positions in the tire axial direction when a normal load is applied to the tire 1 in a normal state and the tire 1 is in contact with a plane at a camber angle of 0°. The tire equator C represents the center position between the tread ground contact ends Te on both sides in the tire axial direction.

The "normal state" represents a state where the tire 1 is mounted on a normal rim and adjusted to have a normal internal pressure, and no load is applied to the tire 1 in a case where the tire 1 is a pneumatic tire. Hereinafter, unless otherwise specified, dimensions and the like of components of the tire 1 are represented by values measured in the normal state.

In a case where a standard system including a standard on which the tire 1 is based is provided, the "normal rim" represents a rim defined for each tire by the standard. Examples of the normal rim include the "standard rim" in the JATMA standard, the "Design Rim" in the TRA standard, and the "Measuring Rim" in the ETRTO standard. In a case where a standard system including a standard on which the tire 1 is based is not provided, the "normal rim" represents a rim having the smallest rim diameter and having the smallest rim width thereamong, from among rims on which the tire 1 can be mounted and which do not cause air leakage.

In a case where a standard system including a standard on which the tire 1 is based is provided, the "normal internal pressure" represents an air pressure defined for each tire by the standard. Examples of the normal internal pressure include the "maximum air pressure" in the JATMA standard, the "maximum value" recited in the table "TIRE LOAD LIMITS AT VARIOUS COLD INFLATION PRESSURES" in the TRA standard, and the "INFLATION PRESSURE" in the ETRTO standard. In a case where a standard system including a standard on which the tire 1 is based is not provided, the "normal internal pressure" represents an air pressure defined for each tire by a manufacturer or the like.

In a case where a standard system including a standard on which the tire 1 is based is provided, the "normal load" represents a load defined for each tire by the standard. Examples of the normal load include the "maximum load capacity" in the JATMA standard, the maximum value recited in the table "TIRE LOAD LIMITS AT VARIOUS COLD INFLATION PRESSURES" in the TRA standard, and the "LOAD CAPACITY" in the ETRTO standard. In a case where a standard system including a standard on which the tire 1 is based is not provided, the "normal load" represents a load defined for each tire by a manufacturer or the like.

The land portions 4 include, for example, a crown land portion 4A demarcated between the pair of crown circumferential grooves 7A, middle land portions 4B demarcated between the crown circumferential grooves 7A and the shoulder circumferential grooves 7B, and shoulder land portions 4C demarcated between the shoulder circumferential grooves 7B and the tread ground contact ends Te.

The lateral grooves 8 include, for example, crown lateral grooves 8A that demarcate block-shape portions of the crown land portion 4A, middle lateral grooves 8B that demarcate block-shaped portions of the middle land portions 4B, and shoulder lateral grooves 8C that demarcate block-shaped portions of the shoulder land portions 4C. FIG. 1 illustrates a state where the first recesses 5 and the second recesses 6 are formed at the shoulder lateral grooves 8C.

As shown in FIG. 2 and FIG. 4, each of the depths d1 and d2 of the first recess 5 and the second recess 6, respectively, is preferably 10% to 70% of the groove depth D1. In a case where the depth d1, d2 is not less than 10% of the groove depth D1, on-snow performance of the tire 1 can be inhibited from being degraded early even when the tire 1 is worn. From such a viewpoint, each of the depths d1 and d2 of the first recess 5 and the second recess 6 is more preferably not less than 20% of the groove depth D1 and even more preferably not less than 30% of the groove depth D1.

In a case where the depth d1, d2 is not greater than 70% of the groove depth D1, the snow treading effect of the first recess 5 and the second recess 6 can be inhibited from being lowered. From such a viewpoint, each of the depths d1 and d2 of the first recess 5 and the second recess 6 is more preferably not greater than 60% of the groove depth D1 and even more preferably not greater than 50% of the groove depth D1. The depth d1 of the first recess 5 and the depth d2 of the second recess 6 are preferably substantially equal to each other.

As shown in FIG. 3, the shape of the first recess 5 at the ground contact surface 2a is preferably a polygonal shape including the first opening 5a and the first end portion 5b. In the present embodiment, the shape of the first recess 5 at the ground contact surface 2a is trapezoidal. The first recess 5 having such a structure allows a force to be applied to snow in the first recess 5 from a plurality of surfaces, and snow can be efficiently trodden.

The shape of the second recess 6 at the ground contact surface 2a is preferably a polygonal shape including the second opening 6a and the second end portion 6b. In the present embodiment, the shape of the second recess 6 at the ground contact surface 2a is trapezoidal. The second recess 6 having such a structure allows a force to be applied to snow in the second recess 6 from a plurality of surfaces, and snow can be efficiently trodden.

A length L2 of the first end portion 5b is preferably not greater than a length L1 of the first opening 5a. A length L4 of the second end portion 6b is preferably not greater than a length L3 of the second opening 6a. The first recess 5 and the second recess 6 having such structures more effectively inhibit generation of snow clogging and can further enhance on-snow performance of the tire 1.

Difference (L1−L2) between the length L1 of the first opening 5a and the length L2 of the first end portion 5b is preferably not greater than 4 mm. Difference (L3−L4) between the length L3 of the second opening 6a and the length L4 of the second end portion 6b is preferably not greater than 4 mm. In a case where the difference (L1−L2) and the difference (L3−L4) are each not greater than 4 mm, the length L2 of the first end portion 5b and the length L4 of the second end portion 6b can be sufficiently ensured, thereby contributing to enhancement of on-snow performance of the tire 1.

A distance L5 between the first end portion 5b and the first opening 5a is preferably 10% to 50% of a distance L6 between the first end portion 5b and the second groove wall 3b. In a case where the distance L5 is not less than 10% of the distance L6, an effect of compressing snow at the first recess 5 can be sufficiently exhibited. From such a viewpoint, the distance L5 between the first end portion 5b and the first opening 5a is more preferably not less than 15% of the distance L6 between the first end portion 5b and the second groove wall 3b.

In a case where the distance L5 is not greater than 50% of the distance L6, snow clogging in the first recess 5 can be inhibited, and rubber chipping can be inhibited between the first recesses 5 adjacent to each other. From such a viewpoint, the distance L5 between the first end portion 5b and the first opening 5a is more preferably not greater than 35% of the distance L6 between the first end portion 5b and the second groove wall 3b.

A distance L7 between the second end portion 6b and the second opening 6a is preferably 10% to 50% of a distance L8 between the second end portion 6b and the first groove wall 3a. In a case where the distance L7 is not less than 10% of the distance L8, an effect of compressing snow at the second recess 6 can be sufficiently exhibited. From such a viewpoint, the distance L7 between the second end portion 6b and the second opening 6a is more preferably not less than 15% of the distance L8 between the second end portion 6b and the first groove wall 3a.

In a case where the distance L7 is not greater than 50% of the distance L8, snow clogging in the second recess 6 can be inhibited, and rubber chipping can be inhibited between the second recesses 6 adjacent to each other. From such a viewpoint, the distance L7 between the second end portion 6b and the second opening 6a is more preferably not greater than 35% of the distance L8 between the second end portion 6b and the first groove wall 3a.

The distance L5 between the first end portion 5b and the first opening 5a and the distance L7 between the second end portion 6b and the second opening 6a are preferably equal to each other. The first recess 5 and the second recess 6 having such structures allow snow to be uniformly trodden on both sides of the groove 3, and contribute to enhancement of on-snow performance of the tire 1.

As shown in FIG. 2 and FIG. 4, the first recess 5 has, for example, a first bottom surface 5c that defines the inner side in the tire radial direction. The first bottom surface 5c preferably includes a parallel surface that is substantially parallel to the ground contact surface 2a. In the present embodiment, the first bottom surface 5c is formed as a parallel surface that is substantially parallel to the ground contact surface 2a. The first recess 5 having such a structure allows snow to be efficiently trodden between a road surface and the first bottom surface 5c, and contributes to enhancement of on-snow performance of the tire 1.

The second recess 6 has, for example, a second bottom surface 6c that defines the inner side in the tire radial direction. The second bottom surface 6c preferably includes a parallel surface that is substantially parallel to the ground contact surface 2a. In the present embodiment, the second bottom surface 6c is formed as a parallel surface that is substantially parallel to the ground contact surface 2a. The second recess 6 having such a structure allows snow to be efficiently trodden between a road surface and the second bottom surface 6c, and contributes to enhancement of on-snow performance of the tire 1.

Figure 5:
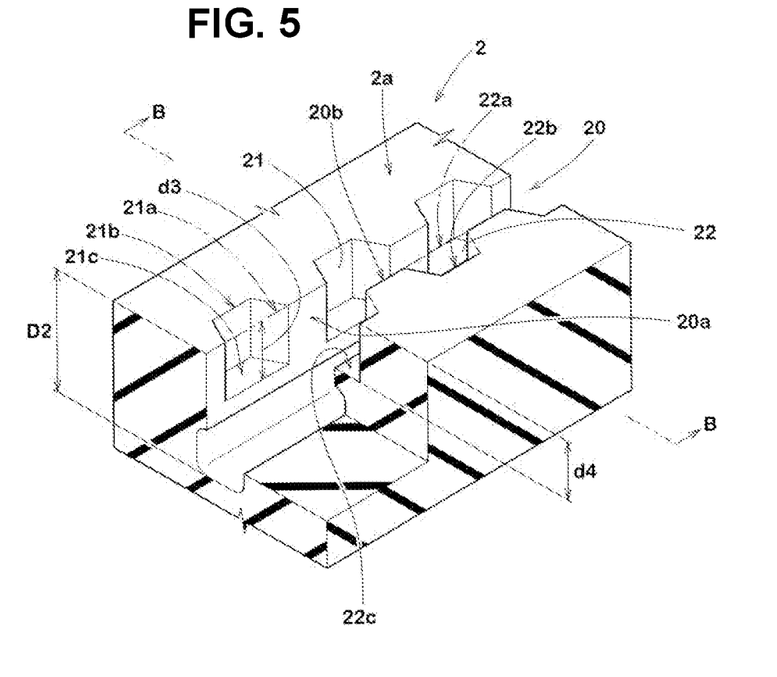
FIG. 5 is a perspective cross-sectional view of a groove of a second embodiment.
Figure 6:
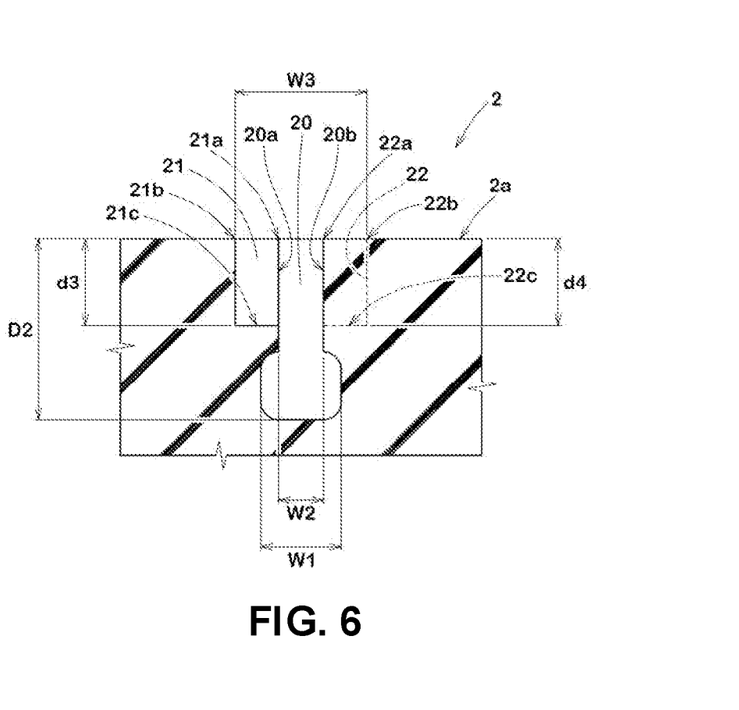
FIG. 6 is a cross-sectional view taken along a line B-B in FIG. 5.

FIG. 5 is a perspective cross-sectional view of a groove 20 of a second embodiment. FIG. 6 is a cross-sectional view taken along a line B-B in FIG. 5. The same components as those of the above-described embodiment are denoted by the same reference characters, and the description thereof is omitted. As shown in FIG. 5 and FIG. 6, the groove 20 of the second embodiment is disposed in the tread portion 2. For example, the groove 20 may be the groove 20 disposed as a different groove in the tread portion 2 having the above-described groove 3, or may be the groove 20 disposed in the tread portion 2 of the tire 1 different from the tire having the groove 3.

The groove 20 includes, for example, a first groove wall 20a and a second groove wall 20b opposing each other. In the second embodiment, the tread portion 2 includes at least one first recess 21 formed by partially recessing the first groove wall 20a and at least one second recess 22 formed by partially recessing the second groove wall 20b.

In the second embodiment, depths d3, d4 of the first recess 21 and the second recess 22, respectively, from the ground contact surface 2a are each less than a groove depth D2 of the groove 20. The first recess 21 and the second recess 22 having such structures allow snow to be trodden also during running on a compressed snow road surface, and contribute to enhancement of on-snow performance of the tire 1.

In the second embodiment, the first recess 21 has, in the ground contact surface 2a, a first opening 21a disposed at the first groove wall 20a, and a first end portion 21b extending substantially parallel to the first opening 21a at the position farthest from the first opening 21a. Preferably, the first recess 21 further includes a first bottom surface 21c that defines the inner side in the tire radial direction.

In the second embodiment, the second recess 22 has, in the ground contact surface 2a, a second opening 22a disposed at the second groove wall 20b, and a second end portion 22b extending substantially parallel to the second opening 22a at the position farthest from the second opening 22a. Preferably, the second recess 22 further includes a second bottom surface 22c that defines the inner side in the tire radial direction.

As shown in FIG. 5, in the second embodiment, the first end portion 21b and the second end portion 22b are disposed so as not to oppose each other through the groove 20, similarly to the first recess 5 and the second recess 6 described above. The first recess 21 and the second recess 22 having such structures can inhibit snow clogging therein and can enhance on-snow performance of the tire 1. The first recess 21 and the second recess 22 are suitable for treading snow in a wide range of a compressed snow road surface, and contribute to enhancement of on-snow performance of the tire 1.

As shown in FIG. 6, in the groove 20 of the second embodiment, a groove width W1 at a portion inward of the first bottom surface 21c in the tire radial direction is greater than a groove width W2 at the depth d3 position of the first bottom surface 21c. The groove 20 has, for example, a substantially rectangular cross-section in the portion inward of the first bottom surface 21c in the tire radial direction. That is, in the second embodiment, the groove width W1 at the groove depth D2 position is greater than the groove width W2 at the depth d3 position.

The depth d3 of the first bottom surface 21c and the depth d4 of the second bottom surface 22c are preferably substantially equal to each other. Therefore, in the second embodiment, the groove width W1 at the groove depth D2 position is greater than the groove width W2 at the depth d4 position. In the groove 20 having such a structure, a certain groove volume can be ensured even when wear has progressed, and on-snow performance of the tire 1 can be inhibited from being rapidly degraded due to wear. This effect is particularly significant in a case where, for example, an imaginary groove width W3 at the ground contact surface 2a is small and is about 4 to 5 mm. The imaginary groove width W3 represents a distance between the first end portion 21b and the second end portion 22b in the direction orthogonal to the longitudinal direction of the groove 20

Difference (W1−W2) between the groove width W1 at the groove depth D2 position and the groove width W2 at the depth d3, d4 position is preferably not greater than 4 mm. In a case where the difference (W1−W2) is not greater than 4 mm, demolding is facilitated after vulcanization-molding and rubber chipping can be inhibited during demolding.

The cross-sectional shape of the groove 20 in the portion inward of the first bottom surface 21c in the tire radial direction is not limited to the illustrated shape, and various shapes such as a round shape, an ellipsoidal shape, a triangular shape, and a trapezoidal shape can be adopted.

As shown in FIG. 5 and FIG. 6, the first bottom surface 21c preferably includes a parallel surface that is substantially parallel to the ground contact surface 2a. In the second embodiment, the first bottom surface 21c is formed as a parallel surface that is substantially parallel to the ground contact surface 2a. The first recess 21 having such a structure allows snow to be efficiently trodden between a road surface and the first bottom surface 21c, and contributes to enhancement of on-snow performance of the tire 1.

The second bottom surface 22c preferably includes a parallel surface that is substantially parallel to the ground contact surface 2a. In the present embodiment, the second bottom surface 22c is formed as a parallel surface that is substantially parallel to the ground contact surface 2a. The second recess 22 having such a structure allows snow to be efficiently trodden between a road surface and the second bottom surface 22c, and contributes to enhancement of on-snow performance of the tire 1.

Figure 7:
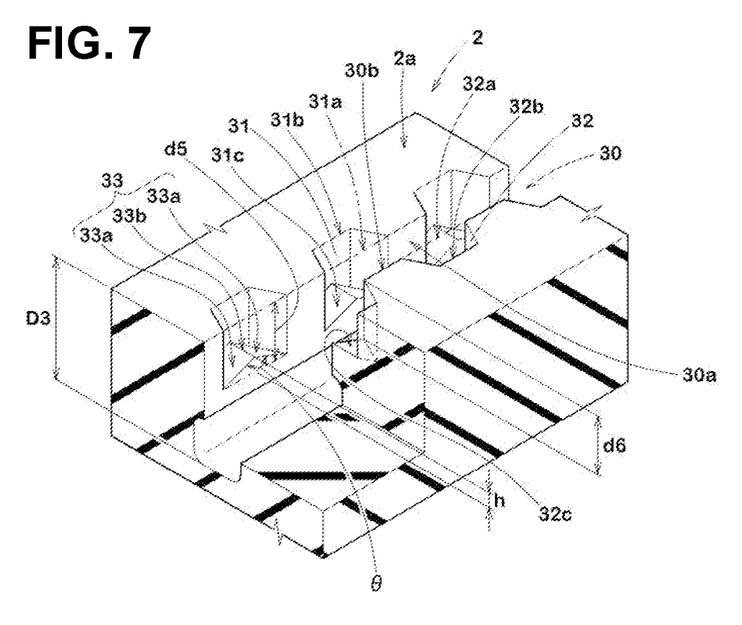
FIG. 7 is a perspective cross-sectional view of a groove of a third embodiment.

FIG. 7 is a perspective cross-sectional view of a groove 30 of a third embodiment. The same components as those of the above-described embodiments are denoted by the same reference characters, and the description thereof is omitted. As shown in FIG. 7, the groove 30 of the third embodiment is disposed in the tread portion 2. For example, the groove 30 may be the groove 30 disposed as a different groove in the tread portion 2 having the above-described groove 3, 20, or may be the groove 30 disposed in the tread portion 2 of the tire 1 different from the tire having the groove 3, 20.

The groove 30 includes, for example, a first groove wall 30a and a second groove wall 30b opposing each other. In the third embodiment, the tread portion 2 includes at least one first recess 31 formed by partially recessing the first groove wall 30a and at least one second recess 32 formed by partially recessing the second groove wall 30b.

In the third embodiment, each of depths d5, d6 of the first recess 31 and the second recess 32, respectively, from the ground contact surface 2a is less than a groove depth D3 of the groove 30. The first recess 31 and the second recess 32 having such structures allow snow to be trodden even during running on a compressed snow road surface, and contribute to enhancement of on-snow performance of the tire 1.

In the third embodiment, the first recess 31 has, in the ground contact surface 2a, a first opening 31a disposed at the first groove wall 30a, and a first end portion 31b extending substantially parallel to the first opening 31a at the position farthest from the first opening 31a. Preferably, the first recess 31 further includes a first bottom surface 31c that defines the inner side in the tire radial direction.

In the third embodiment, the second recess 32 has, in the ground contact surface 2a, a second opening 32a disposed at the second groove wall 30b, and a second end portion 32b extending substantially parallel to the second opening 32a at the position farthest from the second opening 32a. Preferably, the second recess 32 further includes a second bottom surface 32c that defines the inner side in the tire radial direction.

In the third embodiment, the first end portion 31b and the second end portion 32b are disposed so as not to oppose each other through the groove 30. The first recess 31 and the second recess 32 having such structures can inhibit snow clogging therein, and can enhance on- snow performance of the tire 1. The first recess 31 and the second recess 32 are suitable for treading snow in a wide range of a compressed snow road surface, and contribute to enhancement of on- snow performance of the tire 1.

The first bottom surface 31c includes, for example, a protrusion 33 protruding outwardly in the tire radial direction from a parallel surface that is substantially parallel to the ground contact surface 2a. The second bottom surface 32c also includes, for example, the protrusion 33 protruding outwardly in the tire radial direction from a parallel surface that is substantially parallel to the ground contact surface 2a, which is not shown. In the first bottom surface 31c and the second bottom surface 32c having such structures, movement of snow can be inhibited by the protrusion 33, and snow can be more effectively trodden.

In the third embodiment, each protrusion 33 includes two inclined surfaces 33a adjacent to each other, and an apex 33b between the two inclined surfaces 33a. In the protrusion 33 having such a structure, the apex 33b can stick into snow, movement of snow can be more assuredly inhibited, and snow can be more effectively trodden.

A height h of the apex 33b in the tire radial direction from the end portion of the inclined surface 33a on the inner side in the tire radial direction is preferably 10% to 40% of each of the depths d5, d6 of the first recess 31 and the second recess 32. In a case where the height h is not less than 10% of the depth d5, d6, the sticking effect of the apex 33b can be assuredly exhibited. From such a viewpoint, the height h of the apex 33b is more preferably not less than 15% of each of the depths d5, d6 of the first recess 31 and the second recess 32.

In a case where the height h is not greater than 40% of the depth d5, d6, reduction of the volumes of the first recess 31 and the second recess 32 can be inhibited. From such a viewpoint, the height h of the apex 33b is more preferably not greater than 35% of each of the depths d5, d6 of the first recess 31 and the second recess 32.

An angle θ formed by the two inclined surfaces 33a adjacent to each other is preferably 105 to 135°. In a case where the angle θ is not less than 105°, the sticking effect of the apex 33b can be assuredly exhibited. From such a viewpoint, the angle θ formed by the inclined surfaces 33a is more preferably not less than 110°.

In a case where the angle θ is not greater than 135°, reduction of the volumes of the first recess 31 and the second recess 32 can be inhibited. From such a viewpoint, the angle θ formed by the inclined surfaces 33a is more preferably not greater than 130°.

The shape of the protrusion 33 is not limited to the illustrated shape. For example, the shape as viewed from the groove 30 may be a rectangular shape or a wavy shape. Furthermore, for example, a plurality of the protrusions 33 may be disposed in each of the first recesses 31 and the second recesses 32.

Although particularly preferable embodiments of the present disclosure have been described above in detail, the present disclosure is not limited to the above-described embodiments, and various modifications can be devised to implement the technique of the present disclosure.

EXAMPLES

Tires having the shoulder lateral grooves shown in FIG. 2, FIG. 5, and FIG. 7 were produced as test tires based on the specifications indicated in Table 1 and Table 2. As a comparative example, a tire having no first recess and no second recess was produced as a test tire. The tires produced as the test tires were used to test on-snow performance during running on a compressed snow road surface. Common specifications and a test method were as follows.

Common Specifications

Tire size: LT265/70R18
Air pressure: 550 kPa
Test vehicle: large SUV

On-Snow Performance

The test tires were mounted to all wheels of the test vehicle, and a test driver made sensory evaluation for characteristics about grip and responsiveness to acceleration and deceleration on a compressed snow road surface in a test course. The results are indicated as scores with the score of Comparative example 1 being 100. The greater the value is, the more excellent on-snow performance is.

Table 1 and Table 2 indicate the test results.

TABLE 1

|  | Comp. Ex. 1 | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- |
| Shape of groove | Having no recess | FIG. 2 | FIG. 2 | FIG. 2 | FIG. 2 | FIG. 2 | FIG. 2 | FIG. 2 | FIG. 2 |
| Ratio d/D (%) of recess depth d to groove depth D | — | 70 | 50 | 40 | 30 | 10 | 40 | 40 | 40 |
| Ratio La/Lb (%) of distance La between end portion and opening to distance Lb between end portion and groove wall | — | 20 | 20 | 20 | 20 | 20 | 10 | 30 | 50 |
| Difference Lc − Ld (mm) between length Lc of opening and length Ld of end portion | — | 1 | 1 | 1 | 1 | 1 | 1 | 1 | 1 |
| Difference W1 − W2 (mm) between groove width W1 at groove depth position and groove width W2 at recess depth position | — | 0 | 0 | 0 | 0 | 0 | 0 | 0 | 0 |
| Ratio h/d (%) of apex height h to recess depth d | — | 0 | 0 | 0 | 0 | 0 | 0 | 0 | 0 |
| On-snow performance (score) | 100 | 103 | 110 | 120 | 124 | 107 | 109 | 125 | 128 |

TABLE 2

|  | Ex. 9 | Ex. 10 | Ex. 11 | Ex. 12 | Ex. 13 | Ex. 14 | Ex. 15 | Ex. 16 | Ex. 17 |
| --- | --- | --- | --- | --- | --- | --- | --- | --- | --- |
| Shape of groove | FIG. 2 | FIG. 2 | FIG. 2 | FIG. 5 | FIG. 5 | FIG. 7 | FIG. 7 | FIG. 7 | FIG. 7 |
| Ratio d/D (%) of recess depth d to groove depth D | 40 | 40 | 40 | 40 | 40 | 40 | 40 | 40 | 40 |
| Ratio La/Lb (%) of distance La between end portion and opening to distance Lb between end portion and groove wall | 20 | 20 | 20 | 20 | 20 | 20 | 20 | 20 | 20 |
| Difference Lc − Ld (mm) between length Lc of opening and length Ld of end portion | 2 | 0 | −1 | 1 | 1 | 1 | 1 | 1 | 1 |

TABLE 2-continued

|  | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|
| Difference W1 − W2 (mm) between groove width W1 at groove depth position and groove width W2 at recess depth position | 0 | 0 | 0 | 2 | 4 | 2 | 2 | 2 | 2 |
| Ratio h/d (%) of apex height h to recess depth d | 0 | 0 | 0 | 0 | 0 | 10 | 20 | 30 | 40 |
| On-snow performance (score) | 119 | 121 | 103 | 120 | 120 | 121 | 122 | 123 | 124 |

According to the test results, it was confirmed that evaluation during running on the compressed snow road surface was better in the tires of the examples than in the tire of comparative example, and the tires of the examples had excellent on-snow performance

[Appendix]

The present disclosure includes the following aspects.

Disclosure (1) is a tire including a tread portion having a ground contact surface. The tread portion includes a groove having a first groove wall and a second groove wall opposing each other, at least one first recess formed by partially recessing the first groove wall, and at least one second recess formed by partially recessing the second groove wall. A depth of each of the first recess and the second recess from the ground contact surface is less than a groove depth of the groove. The first recess includes, in the ground contact surface, a first opening disposed at the first groove wall, and a first end portion extending substantially parallel to the first opening at a position farthest from the first opening. The second recess includes, in the ground contact surface, a second opening disposed at the second groove wall, and a second end portion extending substantially parallel to the second opening at a position farthest from the second opening. The first end portion and the second end portion are disposed so as not to oppose each other through the groove.

Disclosure (2) is the tire according to disclosure (1), and, in disclosure (2), a length of the first end portion is not greater than a length of the first opening, and a length of the second end portion is not greater than a length of the second opening.

Disclosure (3) is the tire according to disclosure (1) or (2), and, in disclosure (3), the depth of each of the first recess and the second recess is 10% to 70% of the groove depth.

Disclosure (4) is the tire according to any one of disclosures (1) to (3), and, in disclosure (4), a distance between the first end portion and the first opening is 10% to 50% of a distance between the first end portion and the second groove wall.

Disclosure (5) is the tire according to any one of disclosures (1) to (4), and, in disclosure (5), the distance between the first end portion and the first opening is equal to a distance between the second end portion and the second opening.

Disclosure (6) is the tire according to any one of disclosures (1) to (5), and, in disclosure (6), a shape of the first recess at the ground contact surface is a polygonal shape including the first opening and the first end portion.

Disclosure (7) is the tire according to any one of disclosures (1) to (6), and, in disclosure (7), the first recess has a first bottom surface that defines an inner side in a tire radial direction, and the first bottom surface includes a parallel surface that is substantially parallel to the ground contact surface.

Disclosure (8) is the tire according to any one of disclosures (1) to (6), and, in disclosure (8), the first recess has a first bottom surface that defines an inner side in a tire radial direction, and the first bottom surface includes a protrusion protruding outwardly in the tire radial direction from a parallel surface that is substantially parallel to the ground contact surface.

Disclosure (9) is the tire according to disclosure (8), and, in disclosure (9), the protrusion includes two inclined surfaces adjacent to each other, and an apex between the two inclined surfaces.

Disclosure (10) is the tire according to disclosure (9), and, in disclosure (10), a height of the apex in the tire radial direction from an end portion of each of the inclined surfaces on the inner side in the tire radial direction is 10% to 40% of the depth of the first recess.

Disclosure (11) is the tire according to any one of disclosures (7) to (10), and, in disclosure (11), a groove width of the groove at a portion inward of the first bottom surface in the tire radial direction is greater than a groove width at a depth position of the first bottom surface.

What is claimed is:

1. A tire comprising:
   a tread portion having a ground contact surface,
   wherein the tread portion comprises a transverse groove extending in a tire axial direction, the transverse groove having a first groove wall and a second groove wall opposing each other, at least one first recess formed by partially recessing the first groove wall, and at least one second recess formed by partially recessing the second groove wall,
   wherein a depth of each of the first recess and the second recess from the ground contact surface is less than a groove depth of the transverse groove,
   wherein the first recess comprises, in the ground contact surface, a first opening disposed at the first groove wall, and a first end portion extending substantially parallel to the first opening at a position farthest from the first opening,
   wherein the second recess comprises, in the ground contact surface, a second opening disposed at the second groove wall, and a second end portion extending substantially parallel to the second opening at a position farthest from the second opening,
   wherein the first end portion and the second end portion are disposed so as not to oppose each other through the transverse groove,
   wherein a distance in a tire circumferential direction between the first end portion and the first opening is 10% to 50% of a distance in the tire circumferential direction between the first end portion and the second groove wall,
   wherein the first recess has a first bottom surface that defines an inner side in a tire radial direction, wherein the first bottom surface comprises a protrusion protruding outwardly in the tire radial direction from a parallel surface that is substantially parallel to the ground contact surface, wherein the protrusion comprises two inclined surfaces adjacent to each other, and an apex between the two inclined surfaces, and wherein a height of the apex in the tire radial direction from an end portion of each of the inclined surfaces on the inner side in the tire radial direction is 10% to 40% of the depth of the first recess.

2. The tire according to claim 1, wherein a length of the first end portion is not greater than a length of the first opening, and wherein a length of the second end portion is not greater than a length of the second opening.

3. The tire according to claim 1, wherein
the depth of each of the first recess and the second recess is 10% to 70% of the groove depth.

4. The tire according to claim 1, wherein
a distance between the first end portion and the first opening is equal to a distance between the second end portion and the second opening.

5. The tire according to claim 1, wherein
a shape of the first recess at the ground contact surface is a polygonal shape including the first opening and the first end portion.

6. The tire according to claim 1, wherein
the first recess has a first bottom surface that defines an inner side in a tire radial direction, and wherein the first bottom surface comprises a parallel surface that is substantially parallel to the ground contact surface.

7. The tire according to claim 6, wherein
a groove width of the transverse groove at a portion inward of the first bottom surface in the tire radial direction is greater than a groove width at a depth position of the first bottom surface.

8. The tire according to claim 1, wherein
a groove width of the transverse groove at a portion inward of the first bottom surface in the tire radial direction is greater than a groove width at a depth position of the first bottom surface.

9. The tire according to claim 1, wherein
the depth of each of the first recess and the second recess is 30% to 50% of the groove depth.

10. The tire according to claim 1, wherein
a shape of the first recess at the ground contact surface is trapezoidal, and includes at least the first opening and the first end portion, and wherein a shape of the second recess at the ground contact surface is trapezoidal, and includes at least the second opening and the second end portion.

11. The tire according to claim 1,
wherein a difference between a length of the first opening and a length of the first end portion is less than 4 mm, and wherein a difference between a length of the second opening and a length of the second end portion is less than 4 mm.

12. The tire according to claim 1,
wherein a distance between the second end portion in the tire circumferential direction and the second opening is 10% to 50% of a distance in the tire circumferential direction between the second end portion and the first groove wall.

13. The tire according to claim 7, wherein
a groove width, defined as a distance between the first end portion and the second end portion in a direction orthogonal to a longitudinal direction of the transverse groove, is greater than the groove width of the transverse groove at the portion inward of the first bottom surface in the tire radial direction.

14. The tire according to claim 7, wherein
a difference between the groove width of the transverse groove at the portion inward of the first bottom surface in the tire radial direction and the groove width at the depth position of the first bottom surface is less than 4 mm.

15. The tire according to claim 1, wherein
the tread further comprises a plurality of circumferential grooves extending in the tire circumferential direction, a plurality of transverse grooves, including at least the transverse groove, extending in the tire axial direction, and a plurality of sipes extending in the tire axial direction, and wherein the sipes are disposed in land portions demarcated by the plurality of circumferential and transverse grooves.

16. A tire comprising:
a tread portion having a ground contact surface, wherein the tread portion comprises a transverse groove extending in a tire axial direction, the transverse groove having a first groove wall and a second groove wall opposing each other, at least one first recess formed by partially recessing the first groove wall, and at least one second recess formed by partially recessing the second groove wall, wherein a depth of each of the first recess and the second recess from the ground contact surface is less than a groove depth of the transverse groove, wherein the first recess comprises, in the ground contact surface, a first opening disposed at the first groove wall, and a first end portion extending substantially parallel to the first opening at a position farthest from the first opening, wherein the second recess comprises, in the ground contact surface, a second opening disposed at the second groove wall, and a second end portion extending substantially parallel to the second opening at a position farthest from the second opening, wherein the first end portion and the second end portion are disposed so as not to oppose each other through the transverse groove, wherein the depth of each of the first recess and the second recess is 10% to 70% of the groove depth, wherein a distance in a tire circumferential direction between the first end portion and the first opening is 10% to 50% of a distance in the tire circumferential direction between the first end portion and the second groove wall, wherein a distance in the tire circumferential direction between the second end portion and the second opening is 10% to 50% of a distance in the tire circumferential direction between the second end portion and the first groove wall, wherein the tread further comprises a plurality of circumferential grooves extending in the tire circumferential direction, and at least three land portions demarcated by the plurality of circumferential grooves, wherein the transverse groove is provided in a land portion positioned to extend to a tread ground contact end in the tire axial direction, wherein the groove depth of the transverse groove is constant, wherein the first recess has a first bottom surface that defines an inner side in a tire radial direction, wherein the first bottom surface comprises a protrusion protruding outwardly in the tire radial direction from a parallel surface that is substantially parallel to the ground contact surface, wherein the protrusion comprises two inclined surfaces adjacent to each other, and an apex between the two inclined surfaces, and wherein a height of the apex in the tire radial direction from an end portion of each of the inclined surfaces on the inner side in the tire radial direction is 10% to 40% of the depth of the first recess.

17. The tire according to claim 16, wherein a difference between a length of the first opening and a length of the first end portion is less than 4 mm, and wherein a difference between a length of the second opening and a length of the second end portion is less than 4 mm.

\* \* \* \* \*